(12) United States Patent
De Boer

(10) Patent No.: US 10,865,775 B2
(45) Date of Patent: Dec. 15, 2020

(54) METHOD AND DEVICE FOR OPERATING WIND TURBINES

(71) Applicant: Wobben Properties GmbH, Aurich (DE)

(72) Inventor: Wolfgang De Boer, Moormerland (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/468,642

(22) PCT Filed: Dec. 13, 2017

(86) PCT No.: PCT/EP2017/082543
§ 371 (c)(1),
(2) Date: Jun. 11, 2019

(87) PCT Pub. No.: WO2018/108974
PCT Pub. Date: Jun. 21, 2018

(65) Prior Publication Data
US 2020/0095981 A1    Mar. 26, 2020

(30) Foreign Application Priority Data
Dec. 13, 2016   (DE) .......................... 10 2016 124 135

(51) Int. Cl.
*F03D 7/04* (2006.01)
*F03D 9/22* (2016.01)
(Continued)

(52) U.S. Cl.
CPC .............. *F03D 7/048* (2013.01); *F03D 9/22* (2016.05); *F03D 9/257* (2017.02); *H02P 9/006* (2013.01); *H02P 2101/15* (2015.01)

(58) Field of Classification Search
CPC ............. F03D 7/048; F03D 9/22; F03D 9/257
See application file for complete search history.

(56) References Cited

U.S. PATENT DOCUMENTS

| | | | |
|---|---|---|---|
| 8,704,392 | B2 | 4/2014 | Bager et al. |
| 8,994,202 | B2 | 3/2015 | Gupta et al. |

(Continued)

FOREIGN PATENT DOCUMENTS

| | | |
|---|---|---|
| CN | 102545254 A | 7/2012 |
| CN | 103348131 A | 10/2013 |

(Continued)

*Primary Examiner* — Sean Gugger
(74) *Attorney, Agent, or Firm* — Seed Intellectual Property Law Group LLP

(57) ABSTRACT

Provided is a method for operating wind energy converters, in particular of a wind farm. The power limitation mode in this case comprises the steps of turning off at least one of the wind energy converters and operating at least one wind energy converter different to the turned-off wind energy converter, activating a generator heating of the turned-off wind energy converter, turning off the working wind energy converter at or after occurrence of a predefined event, in particular after a predefined time period has elapsed or when a predefined instant is reached, and activating the generator heating of the wind energy converter turned off at or after the occurrence of the predefined event. Provided is a wind farm and to a wind energy converter for carrying out such a method.

20 Claims, 2 Drawing Sheets

(51) Int. Cl.
    *F03D 9/25*     (2016.01)
    *H02P 9/00*     (2006.01)
    *H02P 101/15*     (2016.01)

(56) References Cited

U.S. PATENT DOCUMENTS

| | | |
|---|---|---|
| 9,496,813 B2 | 11/2016 | Gupta et al. |
| 9,845,790 B2 | 12/2017 | de Boer et al. |
| 9,957,952 B2 | 5/2018 | Giertz |
| 10,221,834 B2 | 3/2019 | Steele et al. |
| 10,270,287 B2 | 4/2019 | Beekmann |
| 2008/0224670 A1* | 9/2008 | Liu .................. H02J 3/383 322/7 |
| 2010/0013244 A1* | 1/2010 | Shimizu ............ E05C 9/04 292/34 |
| 2013/0175801 A1* | 7/2013 | Matzen ............. F03D 7/048 290/44 |
| 2015/0214726 A1 | 7/2015 | Hsiao et al. |
| 2016/0025069 A1 | 1/2016 | Hilling |
| 2017/0022975 A1* | 1/2017 | De Boer ............ F03D 7/0264 |
| 2017/0373533 A1* | 12/2017 | Beekmann ......... F03D 9/12 |

FOREIGN PATENT DOCUMENTS

| | | |
|---|---|---|
| CN | 104471242 A | 3/2015 |
| CN | 105518294 A | 4/2016 |
| DE | 102013222452 A1 | 5/2015 |
| DE | 102014206884 A1 | 10/2015 |
| DE | 102015201431 A1 | 7/2016 |
| JP | 2004523692 A | 8/2004 |
| JP | 2013170507 A | 9/2013 |
| JP | 2016533142 A | 10/2016 |
| RU | 2075636 C1 | 3/1997 |
| RU | 2584630 C2 | 5/2016 |
| WO | 2011/148500 A1 | 12/2011 |

* cited by examiner

METHOD AND DEVICE FOR OPERATING WIND TURBINES

BACKGROUND

Technical Field

The invention relates to the operation of wind energy converters of a wind farm, particularly in a power limitation mode.

Description of the Related Art

Besides conventional large power plants, which provide electrical energy for example by means of fossil fuels and are used to ensure the basic load level, wind energy converters are nowadays increasingly being connected to a supply grid in order to deliver electrical power together into the supply grid. Like gas, water and solar power plants, wind energy converters are often used to provide the medium and peak load levels in the supply grid.

One reason for the increased use of wind energy converters is that wind energy converters have the advantage over conventional power plants that the electrical power to be delivered can be adapted particularly flexibly in respect of its parameters to the demand of the loads connected to the supply grid within very short lengths of time. In contrast, for example, the process of increasing or reducing electrical power to be delivered by conventional large power plants is very slow. Adaptation, i.e., increasing or reducing the power to be delivered, can take several hours in the case of large power plants.

The increasing number of wind energy converters in order to ensure high flexibility, however, is ever more frequently leading to longer-term limitations of the electrical power to be delivered by individual wind energy converters, since the total amount of electrical energy provided by all the wind energy converters together cannot be taken by the loads. Not uncommonly, the electrical power to be delivered by the wind energy converters in this case remains limited for several hours or even days so that they must deliver very little energy or even no more energy into a supply grid. To this end, setpoint values for a wind farm or individual wind energy converters are conventionally provided by the grid operator and sent via a data communication line to the wind farm or to individual wind energy converters.

In the case in which a grid operator sends a setpoint value, which may also be referred to as a power setpoint value, to a wind farm, which for example stipulates that the wind farm could no longer deliver any electrical energy into the supply grid connected to the wind farm, for the case in which electrical power is still being delivered into the supply grid a wind farm operator even has to reckon with "fines" instead of financial credit for the power nevertheless being delivered. From the viewpoint of the wind farm operator, it is therefore desirable to comply as accurately as possible with the setpoint value specifications given.

In the case in which a wind farm must then deliver only very little energy or even no more energy into the supply grid connected to the wind farm, the individual wind energy converters rotate with a low speed, and optionally only the self-excitation of the generator is still maintained. In the case in which this state of the individual wind energy converters lasts for several hours or days, particularly in unfavorable climatic conditions, for example during a storm and/or high air humidity, the risk arises that the electronic components of the wind energy converter, for example the generator or the inverters, will become moist or even wet. Besides normal corrosion damage which may occur because of this, the risk also arises that, in the case in which the power is intended to be increased again within a very short time, damage to the generator and the inverters will take place since high currents and voltages are applied to the moist or wet components and the conditions for unimpaired insulation are possibly no longer provided. In this case, damage may therefore take place, because of which the entire operation of the wind energy converter must be adjusted until repairs. Temporary total failure would therefore be the consequence.

In order to avoid damage by moisture or wetness, heating devices are known which are arranged in the region of the electronic parts of a wind energy converter and, in the case in which it is generating only very little energy or no energy, protect the electronic parts from becoming moist or wet. In order to operate these heating elements, energy is often even drawn from the supply grid, which the converter operator must then pay for. Such payments are also undesirable.

The German Patent and Trade Mark Office has consulted the following prior art in the priority application of the present application: DE 10 2015 201 431 A1.

BRIEF SUMMARY

Provided is a method to operate a wind farm, in the case in which it is intended to deliver only very little power or no power into a supply grid, in such a way that it delivers as far as possible no power or at least very little power into the supply grid and that it also draws no power or only very little power from the supply grid. The method prevents or minimizes the electrical component parts of the wind energy converters of the wind farm from becoming moist or wet.

Provided is a method for operating wind energy converters, in particular of the same wind farm, in a power limitation mode. In this case, the power limitation mode initially comprises turning off at least one of the wind energy converters and operating at least one wind energy converter different to the turned-off wind energy converter. Operation of a wind energy converter in this case means that the wind energy converter provides electrical energy. Turning off a wind energy converter means that it does not provide electrical energy, i.e., generate electrical energy from kinetic wind energy. However, turning off does not mean that the rotor and the generator are stopped. Preferably, these also rotate in the off state of the wind energy converter.

A power limitation mode corresponds in this case to a way of operating the wind energy converters in which only a very low electrical power, or even no electrical power, is intended to be delivered into a supply grid connected to the wind energy converters.

A generator heating of the turned-off wind energy converter is furthermore activated. In addition, the working wind energy converter is turned off at or after occurrence of a predefined event. Furthermore, the generator heating of the wind energy converters turned off at or after the occurrence of a predefined event is activated.

The invention is based on the discovery that a wind energy converter which is operated merely in order to provide energy for heating another wind energy converter itself generates so little heat by this operation that this is not sufficient in order to avoid moisture precipitation or wetness in the region of the electronic components. Heating of a wind energy converter which is in operation is, however, not possible with a generator heating since no generation of electrical energy is then possible because of the way in which the generator is connected in order to be able to use it as a heater.

By turning off of the wind energy converter which previously provided the energy for the generator heating of another wind energy converter, heating of this wind energy converter which previously provided the energy is possible. The energy supply of the generator heating is then undertaken by another wind energy converter, which has preferably been heated beforehand and is therefore dry and free of moisture.

In this case, the predefined event is preferably elapsing of a predefined time period or reaching of a predefined instant. Essentially, the wind energy converters are thus heated in order for a particular time, before then being operated for a particular time in order to provide a low energy for heating other wind energy converters. Before the risk of moisture can occur, however, the working converters are turned off again and heated.

According to another alternative, the predefined event is at least one predefined sensor value of at least one predefined sensor. The sensor is, for example, arranged at the generator and configured as a moisture sensor and/or temperature sensor. If, accordingly, for example the risk of moisture of the generator is detected with the sensor by occurrence of predefined moisture values, the working wind energy converter is turned off and heated with the generator heating.

Damage to wind energy converters by wetness or moisture is therefore substantially counteracted. At the same time, no energy for the heating is drawn from the supply grid since at least one wind energy converter already provides this energy for the heating. On the other hand, no energy is delivered to the supply grid either, since the wind energy converters which provide the energy for the heating are operated at an operating point at which only the energy which is actually required for the heating inside the wind farm is produced. In particular, the development of moisture in individual converters is thus counteracted by the alternate turning of the individual wind energy converters on and off.

According to a first embodiment, the power limitation mode is carried out with a delay or immediately when setpoint value specifications for the power to be delivered into a supply grid by the wind farm are equal to or fall below a predefined threshold value. Accordingly, the power limitation mode, in which the wind energy converters are alternately switched to and fro between a state in which on the one hand generator heating is activated in order to heat the wind energy converter and keep it free of moisture and on the other hand the wind energy converter generates energy in order to supply generator heating operations of other wind energy converters, is thus carried out with a delay or immediately when setpoint value specifications are equal to or fall below the predefined threshold value.

An advantage of delayed implementation of the power limitation mode is that, in the case in which the setpoint value specifications fall to or below the threshold value only for a short length of time, and a higher power output of the wind farm is therefore again required after only a short time, the entire wind farm does not have to be changed back into normal operation from the power limitation mode which has only just been activated. In this case, it is then accepted that small amounts of electrical power, for which payments must be made by the operator, are briefly delivered to a supply grid, although restarting of the wind energy converters in order to enter normal operation from the power limitation mode, which is likewise associated with drawing a certain amount of power from the supply grid, is avoided. If, however, according to the alternative the power limitation mode is carried out immediately, this offers the advantage that no costs are incurred for "too much" energy delivered to the supply grid.

According to another embodiment, the threshold value corresponds to a value of less than 5% or less than 2.5% of the rated power of the wind farm, for example 0 kilowatts. Accordingly, the threshold value is selected as a very small or low value in order to prevent the wind energy converters entering a power limitation mode even though their operation itself would possibly still generate enough heat and therefore would be sufficient for heating and therefore avoidance of moisture. Unnecessary entry into the power limitation mode can thereby be prevented.

According to another embodiment, in the power limitation mode, a fraction or all of the surplus energy is consumed in the wind farm, i.e., inside the wind farm, preferably with an additional load of the wind farm. This surplus energy comprises the electrical energy, i.e., the amount of electrical energy, which is being generated by one or more working wind energy converters in the power limitation mode and which is not required in order to supply one or more generator heating operations of the activated generator heating operations.

In this way, it is possible to ensure that, even in the case in which one or more of the wind energy converters are generating more energy than can be consumed by the generator heating operations, this surplus energy does not need to be delivered to the grid when a grid operator requires that less or no energy be delivered for the time being.

According to another embodiment, an amount of electrical energy for the electrical power to be delivered by the wind farm is specified, this being done using a setpoint value specification. Furthermore, according to this embodiment the amount of energy in the wind farm which corresponds to the fraction of the surplus energy which lies above the amount of electrical energy defined by the setpoint value specification is consumed in the wind farm, in particular with an additional load of the wind farm.

Accordingly, it is thus possible to deliver exactly the amount of electrical energy defined by the operator using a setpoint value specification into a grid by the wind farm, even if this amount is only very small.

According to another embodiment, the surplus energy is consumed in an additional load. According to various embodiments, a load comprises for example one or more actuators, namely for example one or more rotor blade adjustment drives and/or one or more azimuth drives of one or more wind energy converters. As an alternative or in addition, the load comprises at least one heating device, namely for example at least one blade heater of one or more wind energy converters. Furthermore, at least one accumulator may be provided as a load in the wind farm as an alternative or in addition to the aforementioned loads. In addition or as an alternative, the load comprises a chopper circuit of a wind energy converter or a plurality of chopper circuits of a plurality of wind energy converters, which are preferably arranged in or respectively in, an intermediate circuit of the wind energy converter or of the wind energy converters. In addition or as an alternative, the load comprises at least one inverter of a wind energy converter, which is not being operated, which is operated in phase opposition to at least one inverter of a working wind energy converter.

Such loads are advantageously suitable for consuming a precisely defined amount of surplus energy which is not currently intended to be delivered to a grid. In most cases, the aforementioned loads are already present in a wind farm and can be used directly.

According to another embodiment, the threshold value is adjusted by an installer and/or operator, or can be adjusted by an installer and/or operator. Accordingly, when the wind energy converters of a wind farm are installed, a suitable threshold value may already be specified by the installer on the basis of specific prevalent weather conditions for the installation site. This may preferably also be readjusted later during operation by the operator.

An adaptation of the threshold value as a function of weather conditions specific to the installation site is therefore possible. In dry warm regions, for example, the power limitation mode is sometimes not necessary at all, while in cold wet regions the need for heating a wind energy converter is already necessary even when it is being operated, for example, during operation in which only 5% of the rated power of the wind energy converter is being generated.

According to this exemplary embodiment, in addition or as an alternative, the threshold value can be adjusted automatically as a function of prevailing and/or forecast weather data. Accordingly, depending on weather data received with a weather station, the threshold value is increased in the case of higher humidity and reduced in the case of lower humidity. This ensures that the power limitation mode is actually activated only in cases in which it is required.

According to another embodiment, the power limitation mode is activated and/or deactivated as a function of values, measured with at least one sensor, of the humidity and/or the temperature. Accordingly, if values which represent a risk of condensation on the generator are detected, and if a setpoint value specification of the power to be delivered by the wind farm to a supply grid is set at or below a predefined threshold value, the power limitation mode is activated. According to another embodiment, the power limitation mode is carried out with a delay after a predefined waiting time has elapsed. The waiting time starts to run after the setpoint value specifications for the power to be delivered fall to or below the predefined threshold value. In this way, it is possible to ensure that the residual heat still present in a previously operated wind energy converter is initially used in order to protect the wind energy converter from moisture, if it has been turned off after operation. Heating is not yet necessary at this instant.

According to one embodiment, this waiting time is 4 hours or less than 4 hours, preferably 2 hours or less than 2 hours.

According to another embodiment, a working wind energy converter in the power limitation mode generates an electrical power of less than 5%, in particular less than 2%, for example 1.5%, 0.1% or 0% of its rated power. This ensures that although energy possibly required for heating other wind energy converters is provided, on the other hand reliably no energy for which payments must be made to the grid operator is delivered to the supply grid.

According to another embodiment, the activated generator heating of one or more turned-off wind energy converters of a wind farm is supplied in the power limitation mode with or at least predominantly with the energy which is provided by the at least one working wind energy converter of the same wind farm. This ensures that only little or no energy for which the wind farm operator would have to pay needs to be drawn from the supply grid in the power limitation mode.

According to another embodiment, the activation of the generator heating comprises short-circuiting of the generator stator and application of a predeterminable excitation current to the generator rotor. The excitation current in the generator rotor therefore leads heating of the turns of the electrical conductors of the generator rotor by the resistance of the conductors when the excitation current is passed through these conductors. Furthermore, the excitation of the generator rotor leads to the induction of a flow of current in the generator stator, which is likewise heated by the short circuit. This heating then leads to heating of the generator of the wind energy converter in the region of the nacelle, so that at least electronic components which are located in the region of the nacelle are also heated at the same time.

Preferably, the short circuit for activating the generator heating by a short circuit is carried out by the power semiconductors in the inverter in the base of the tower, so that the rectifier units and the inverters are also heated by the current and protected from moisture. The generator heating therefore heats the entire converter. According to another embodiment, the current induced in the stator is regulated to a predeterminable heating current.

According to another embodiment, in the power limitation mode, during a first interval of the predefined time period or up to one of the predefined instants, every second wind energy converter of the wind farm is operated and the other wind energy converters are heated with the generator heating. After the predefined time period has elapsed or after the one of the predefined instants has been reached, a change then takes place between operation and heating, so that the previously working wind energy converters are heated with the generator heating and the wind energy converters previously heated with the generator heating are operated. After the predefined time period has elapsed again or after a further one of the predefined instants has been reached, a new change takes place, the change between operation and heating taking place until the value of the setpoint value specification for the electrical power to be delivered lies above the predefined threshold value.

By this predefined change between normal operation, which is referred to here as operation for brevity, and heating operation, which is referred to here as heating for brevity, it is possible that the individual wind energy converters of a wind farm do not need to communicate with one another. Rather, the wind energy converters may independently determine with the aid of the established predefined time periods or instants whether they need to activate the generator heating or provide energy for generator heating operations of other wind energy converters.

According to another embodiment, the predefined instants correspond to fixed times of day stored in each of the wind energy converters, at which the wind energy converter, in the power limitation mode, preferably after the waiting time has elapsed, is switched over between operation and heating or between heating and operation. Switchover of the wind energy converter without driving by an external superordinate regulator, such as a wind farm regulator, is therefore possible, and each individual wind energy converter can automatically decide by itself, when receiving a predetermined setpoint value which lies at or below the threshold value, after activation of the power limitation mode, whether it is then heated or operated.

According to another embodiment, in the case in which the length of time between the instant from which the power limitation mode is activated and the next forthcoming instant for the change from the heating mode to the operating mode or from the operating mode to the heating mode lies below a minimum duration, the change due at the next forthcoming instant is not carried out.

This ensures that a change from the heating mode to the operating mode or from the operating mode to the heating mode does not already take place in the converters after brief activation of the power limitation mode, even though for example the generator heating operations in this short length of time, namely the minimum period, still had no effects on the wind energy converter in respect of drying and have already been turned off again. The minimum period is predefined and corresponds for example to a value of 15 minutes or 30 minutes.

Provided is a wind energy converter, in particular for carrying out an exemplary embodiment of the method. The wind energy converter comprises a wind energy converter controller, which is configured in order to operate the wind energy converter in order to electrically supply the generator heating of another wind energy converter and at or after occurrence of a predefined event, for example, after a predefined time period has elapsed or after a predefined instant is reached, to turn off the wind energy converter and activate the generator heating of the wind energy converter.

The method can therefore be carried out without a wind farm controller. The converters accordingly organize the method themselves without the wind farm controller by means of their respective wind energy converter controller, preferably only by means of a time of day and a converter number. A setpoint value for the power may be specified externally, each converter preferably being able to change by itself into the power limitation mode as soon as the predetermined maximum power at the power input of the individual wind energy converters is constantly, for example for more than two hours, below an adjusted limit value of for example 1.5%. To this end, the times of day of the individual wind energy converters are synchronized and in the farm different converter numbers, for example with even and odd numbers, are assigned to the wind energy converters. Communication with a superordinate controller is only optional in this case.

Provided is a wind farm for carrying out a method according to one of the aforementioned embodiments. The wind farm comprises a wind farm controller and/or each of the wind energy converters comprises a wind energy converter controller, which are configured in order to carry out the method.

According to one embodiment, the wind farm controller comprises a data input for connection of a data connection to a grid operator and for receiving setpoint values. The invention furthermore relates to a wind energy converter for carrying out a method of the aforementioned embodiments.

BRIEF DESCRIPTION OF THE SEVERAL VIEWS OF THE DRAWINGS

Further embodiments of the invention may be found from the exemplary embodiments explained in more detail in the figures, in which.

DETAILED DESCRIPTION

Figure 1:
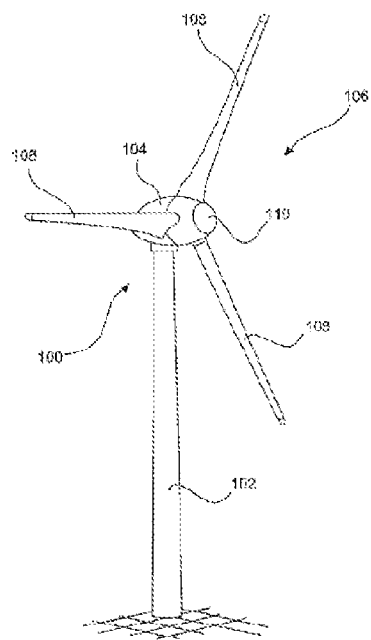
FIG. 1 shows a wind energy converter.

FIG. 1 shows a schematic representation of a wind energy converter 100 of a wind farm 112. The wind energy converter 100 comprises a tower 102 and a nacelle 104 on the tower 102. An aerodynamic rotor 106 having three rotor blades 108 and a spinner 110 is provided on the nacelle 104. During operation of the wind energy converter, the aerodynamic rotor 106 is set in a rotational movement by the wind and therefore also rotates a rotor of a generator, which is directly or indirectly coupled to the aerodynamic rotor 106. The electrical generator is arranged in the nacelle 104 and generates electrical energy. The pitch angle of the rotor blades 108 can be modified by pitch motors at the rotor blade roots of the respective rotor blades 108.

Figure 2:
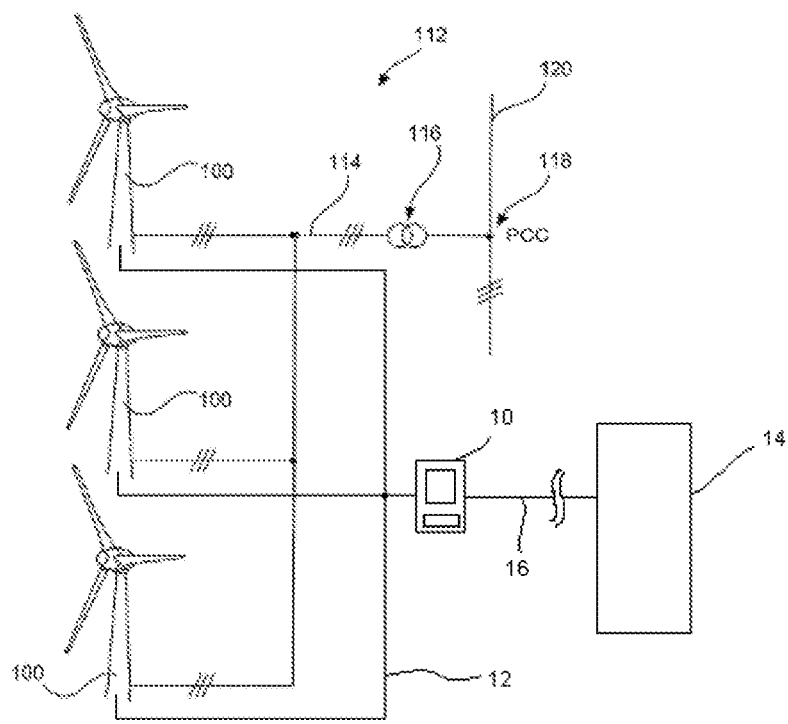
FIG. 2 shows a wind farm.

FIG. 2 shows a wind farm 112 having by way of example three wind energy converters 100, which may be identical or different. The three wind energy converters 100 are therefore representative of in principle an arbitrary number of wind energy converters 100 of a wind farm 112. The wind energy converters 100 provide their power, i.e., in particular the current generated, via an electrical farm grid 114. In this case, the respectively generated currents or powers of the individual wind energy converters 100 are added together and a transformer 116 is usually provided, which transforms up the voltage in the farm 112 in order then to be delivered to the supply grid 120 at the feed point 118, which is also generally referred to as a PCC, grid node or grid feed node. FIG. 2 is only a simplified representation of a wind farm 112. The farm grid 114 may for example also be configured differently, in which for example a transformer 116 is also provided at the output of each wind energy converter 100, to mention only one other exemplary embodiment.

Furthermore, FIG. 2 shows a regulator 10, which in this case is a wind farm regulator 10, which is connected by means of a bus system 12 to each individual wind energy converter 100. FIG. 2 furthermore shows a control center 14 of an operator, namely of a grid operator or of a farm operator. The control center 14 is connected to a data input 15 of the wind farm regulator 10 by means of a connection 16. The connection 16 corresponds, for example, to a TCP/IP connection.

Each of the wind energy converters 100 respectively comprises generator heating, which is not represented in detail. The generator heating comprises the generator of the wind energy converter 100, which has a stator and a rotor. The stator has connection terminals, at which the electrical energy can be taken off during normal operation. The rotor likewise comprises connection terminals via which the excitation current is supplied.

Between the connection terminals of the stator, a contact is provided, which is actuated by a control instrument and short-circuits the stator connections. In order to activate the generator heating, the contact between the connection terminals of the stator is closed and a short circuit is thereby induced. As an alternative, activation is achieved by fully turning on the step-up converter IGBTs in the inverter. A predeterminable excitation current is then fed into the rotor via its connection terminals. The current which is induced in the stator of the generator, and which results from rotation of the generator, can be influenced by the level of the excitation current fed into the rotor. When the stator is short-circuited, the stator voltage is very small and a very high current then flows (short-circuit current) which causes corresponding heat to be formed in the stator. By this heat, the generator, the rectifier and the inverter as a whole are heated, so that the moisture evaporates inside the nacelle 104 and the tower 102 when the generator heating is activated.

Figure 3:
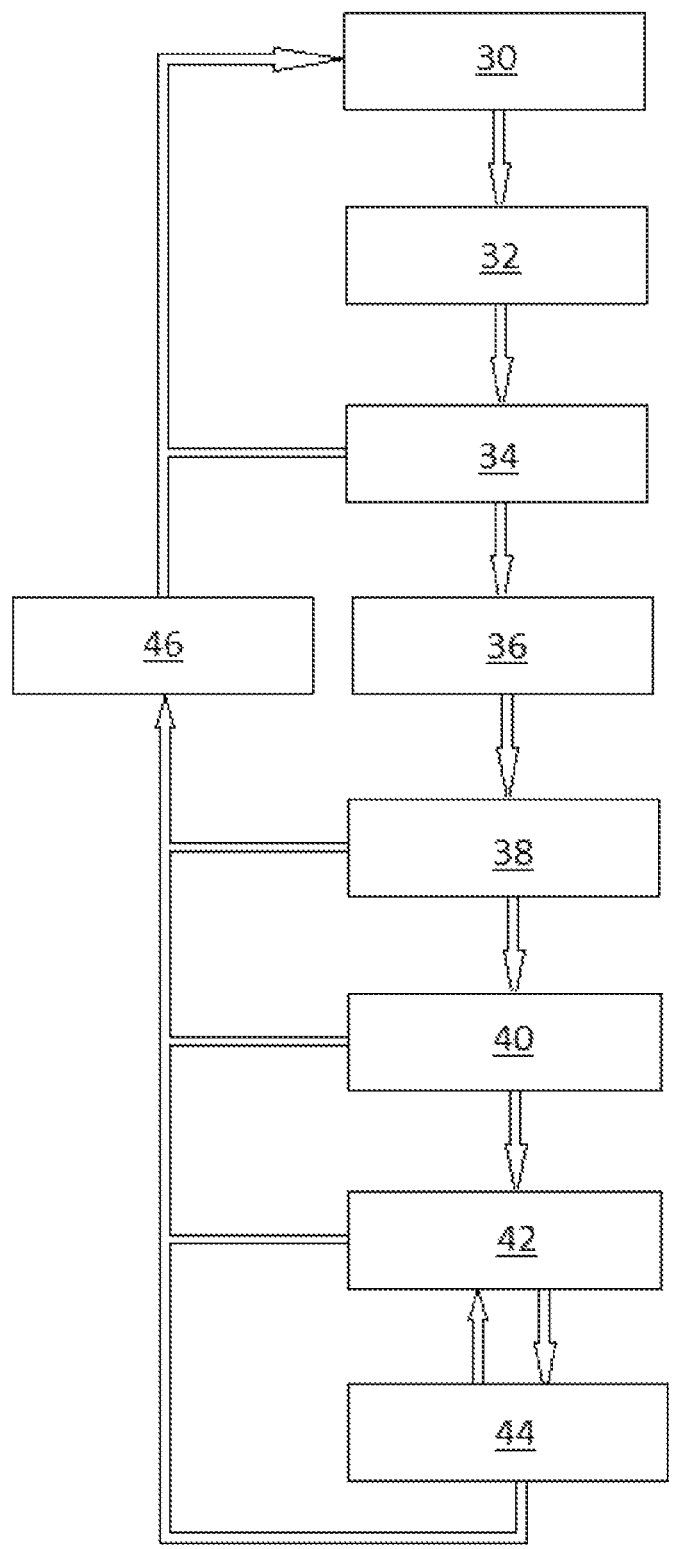
FIG. 3 shows an exemplary embodiment of the method.

FIG. 3 shows the sequence of an exemplary embodiment of the method. In a step 30, a setpoint value, which may also be referred to as a power setpoint value and which is specified by the grid operator, is monitored. In step 32, it is detected that the setpoint value lies below a threshold value, whereupon a waiting time is waited in step 34. If the setpoint value increases back above the threshold value within this waiting time, the method returns to step 30 and again monitors the setpoint value.

In the case in which the setpoint value does not rise back above the threshold value within the waiting time, in step 36 a power limitation mode is activated. In the power limitation mode, in step 38 generator heating of at least one wind energy converter 100 is activated, and in addition the operation of at least one wind energy converter 100 whose generator heating is not activated is activated in step 40.

Next, in step 42, a time period is waited or waiting is carried out until an instant in time. Once the time period has elapsed or the instant in time has been reached, in step 44 a change is then carried out so that at least one of the wind energy converters 100 which was previously being operated is now turned off and its generator heating is activated. In order to supply the generator heating, another wind energy converter 100 is in turn used. So long as the setpoint value lies below the threshold value, steps 42 and 44 are carried out alternately. If the setpoint value exceeds the threshold value in any of steps 38 to 44, the power limitation is turned off in a step 46 and the setpoint value is again monitored in step 30.

The invention claimed is:

1. A method comprising:
   operating a plurality of wind energy converters of a wind farm in a power limitation mode, wherein operating in the power limitation mode comprises:
   turning off a first wind energy converter of the plurality of wind energy converters and operating a second wind energy converter of the plurality of wind energy converters, wherein the second wind energy converter is different from the first wind energy converter;
   activating a generator heating of the first wind energy converter;
   turning off the second wind energy converter at or after occurrence of a predefined event; and
   after turning off the second wind energy converter, activating a generator heating of the second wind energy converter.

2. The method as claimed in claim 1, wherein the predefined event is one of: elapsing of a predefined time period, reaching of a predefined instant in time, or at least one predefined sensor value of at least one predefined sensor.

3. The method as claimed in claim 1, wherein the power limitation mode is carried out with a delay or immediately when setpoint value specifications for an electrical power to be delivered for the electrical power provided by the wind farm are equal to or fall below a predefined threshold value.

4. The method as claimed in claim 3, wherein the predefined threshold value corresponds to a value of less than 5% or 2.5% of a rated power of the wind farm.

5. The method as claimed in claim 1, wherein, in the power limitation mode, a fraction or all of surplus energy not being consumed to supply one or more generator heating operations is consumed in the wind farm.

6. The method as claimed in claim 5, wherein an amount of electrical energy for an electrical power to be delivered by the wind farm, defined by a setpoint value specification, is specified for the wind farm, and an amount of electrical energy which corresponds to the fraction of the surplus energy which lies above an amount defined by the setpoint value specification is consumed in the wind farm.

7. The method as claimed in claim 5, wherein the fraction or all of the surplus energy is consumed in a load, and the load comprises at least one of: an actuator, a heating device, an accumulator, a chopper circuit of a wind energy converter, or an inverter of a wind energy converter that is not being operated.

8. The method as claimed in claim 3, wherein the predefined threshold value is adjusted by an installer or operator or is automatically adjusted as a function of weather data.

9. The method as claimed in claim 3, wherein the power limitation mode is carried out with a delay after a predefined waiting time has elapsed, the predefined waiting time starting to run after the setpoint value specifications for the electrical power to be delivered for the electrical power provided by the wind farm falls to or below the predefined threshold value.

10. The method as claimed in claim 9, wherein the predefined waiting time is 4 hours or less.

11. The method as claimed in claim 1, wherein the plurality of wind energy converters operating in the power limitation mode generate a power of less than 5% of their rated power.

12. The method as claimed in claim 1, wherein activating the generator heating of the first wind energy converter comprises supplying power from at least one wind energy converter operating in the wind farm to the first wind energy converter.

13. The method as claimed in claim 1, wherein activating the generator heating comprises at least one of:
    short-circuiting of a generator stator of the first wind energy converter,
    applying a predeterminable excitation current to a generator rotor of the first wind energy converter, and
    regulating current induced in the generator stator to a predeterminable heating current.

14. The method as claimed in claim 3, wherein the predefined event is a predefined time period, wherein, in the power limitation mode, during a first interval of the predefined time period, a group of second wind energy converters of the wind farm are operated and a group of first wind energy converters are heated by the generator heating, and after the predefined time period has elapsed, a change takes place between operation and heating, so that the group of second wind energy converters are heated with the generator heating and the group of first wind energy converters are operated, and after the predefined time period has elapsed again, a new change takes place, wherein changing between operating and heating takes place until a value of the setpoint value specifications increases above the predefined threshold value.

15. The method as claimed in claim 14, wherein the predefined time period corresponds to fixed times of day stored in each of the plurality of wind energy converters, at which the respective wind energy converter, in the power limitation mode, is switched over between operating and heating or between heating and operating.

16. The method as claimed in claim 1, wherein, in the case in which a length of time between an instant from which the power limitation mode is activated and a next forthcoming instant for a change from a heating mode to an operating mode or from the operating mode to the heating mode lies below a minimum duration, the change due at the next forthcoming instant is not carried out.

17. A wind farm configured to carry out a method as claimed in claim 1, wherein the wind farm comprises a wind farm controller configured to:
    turn off the first wind energy converter of the wind farm;
    operate the second wind energy converter of the wind farm, activate the generator heating of the first wind energy converter, turn off the second wind energy converter at or after occurrence of the predefined event, and activate the generator heating of the second wind energy converter.

18. The wind farm as claimed in claim 17, wherein the wind farm controller comprises a data input configured to provide a data connection for at least one of: a grid operator or receiving setpoint values.

19. A wind energy converter configured to carry out the method as claimed in claim 1, wherein the wind energy converter comprises a wind energy converter controller configured to activate the plurality of wind energy converters to electrically supply generator heating of a respective one of the plurality of wind energy converters.

20. The method as claimed in claim 2, wherein the at least one predefined sensor is at least one of: a humidity sensor or a temperature sensor, and is arranged in a region of the generator.

* * * * *